United States Patent [19]
Casperson

[11] 4,210,438
[45] Jul. 1, 1980

[54] AMMONIATED PHOSPHORIC ACID FERTILIZER PRODUCTION

[75] Inventor: Philip W. Casperson, Houston, Tex.

[73] Assignee: Occidental Petroleum Corporation, Los Angeles, Calif.

[21] Appl. No.: 831,344

[22] Filed: Sep. 7, 1977

[51] Int. Cl.² .............................................. C05B 7/00
[52] U.S. Cl. ........................................ 71/34; 71/44; 71/43
[58] Field of Search .................. 71/33, 34, 36, 42, 43, 71/44; 423/309, 310, 314, 315

[56] References Cited

U.S. PATENT DOCUMENTS

| T942,006 | 1/1976 | Achorn et al. | 423/310 |
| T950,011 | 9/1976 | Hicks et al. | 71/34 |
| 1,989,175 | 1/1935 | Siems | 423/310 |
| 3,988,140 | 10/1976 | Burns et al. | 71/34 |
| 4,056,381 | 11/1977 | Kenton | 71/36 |

Primary Examiner—Joseph Scovronek
Assistant Examiner—Chris Konkol
Attorney, Agent, or Firm—Barry A. Bisson

[57] ABSTRACT

Liquid ammonia, a reactant with superphosphoric acid in the process for fertilizer production, is passed through an annular jacket surrounding a tubular reaction zone where reaction occurs to maintain the interior surface of the tubular reactor at a temperature sufficiently low to prevent the formation of scale on interior reactor surfaces.

17 Claims, 2 Drawing Figures

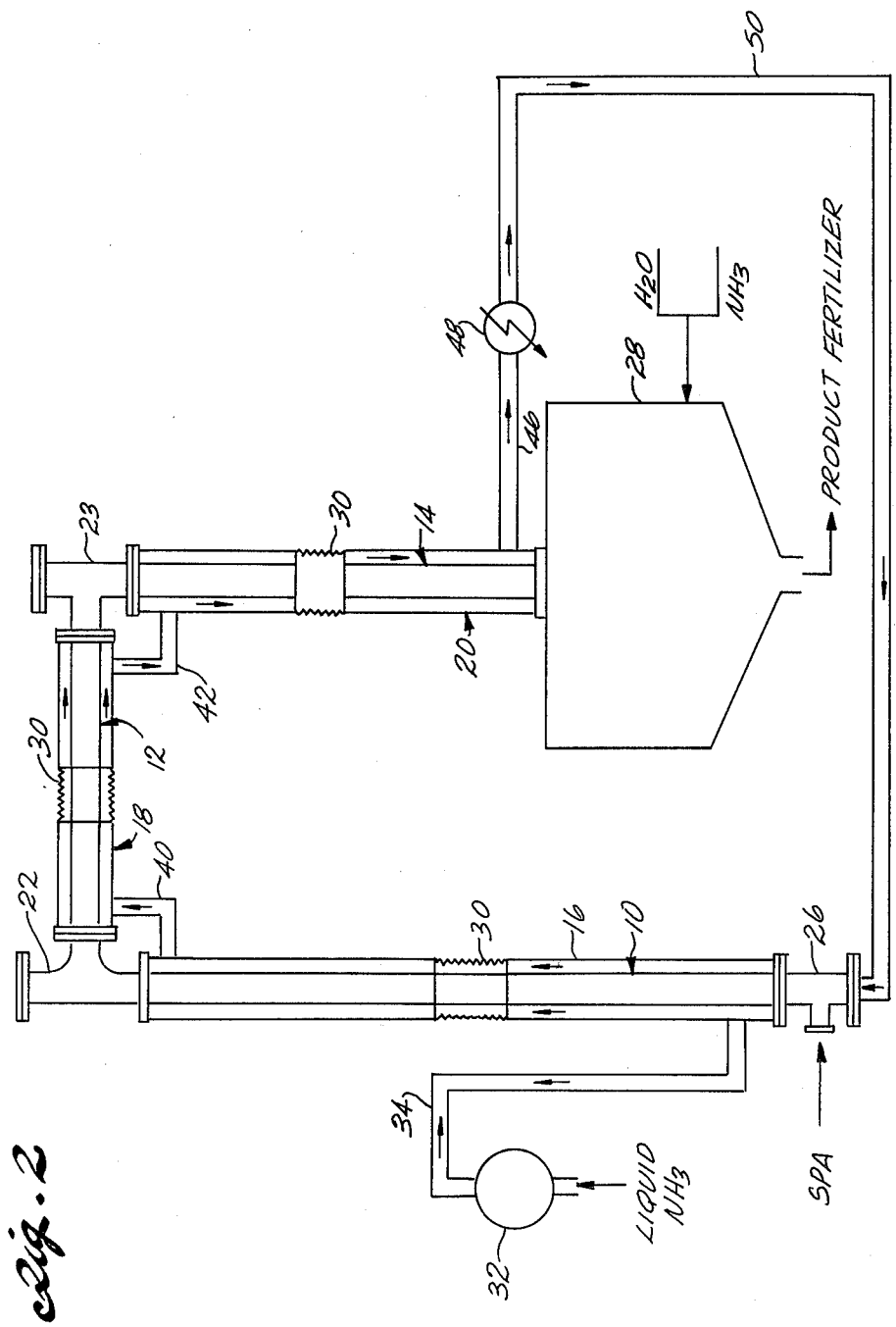

4,210,438

AMMONIATED PHOSPHORIC ACID FERTILIZER PRODUCTION

BACKGROUND OF THE INVENTION

Fertilizers are produced by ammoniation of phosphoric acid ($H_3PO_4$) polymerized to levels ranging from 10 to 40% poly content. Such acids are commonly termed "superphosphoric acids". Various ammonium phosphates and polyphosphates are formed. Simultaneously, the phosphate constituents are further polymerized to levels as high as 90%, more typically from about 70 to about 80%. The final product may be a fertilizer of 10-34-0, 11-37-0, and 12-40-0 ($N_2$-$P_2O_5$-$K_2O$) which retains only about 65 to 80% of the polymerized ammoniated phosphates. In the process, a portion of the total ammonia is reacted with a melt of superphosphoric acid followed by reaction of ammonia and water with the initial reaction product to realize a fertilizer of desired assay.

Reactions have been carried out in tubular reactors in a temperature range from about 600° to about 750° F. In the employment of tubular reactors, walls have been constructed of steel, stainless steel, Hastaloys, Tantalum and other corrosive resistant metals.

Despite the selection of the materials of construction scaling of the interior surface of the tubular reactors has occurred. Scale deposits contain one or more of the metals Fe, Al, and Mg complexed into ammonium pyrophosphates. Buildup of scale continues until the tubular reactor can no longer function. This requires breakdown of the reactor for cleaning.

Propane or acetylene torches are used to heat and melt part of the scale solids. Beating out the remainder of the solids with hammers is often necessary. This scores or mutilates the reactor making secondary buildup upon reassembly more rapid. Plant shutdown because of scale buildup in a tubular reactor can occur after use of 150 to 500 tons of raw material depending on the source of polyphosphoric acid used. It is believed the rate of corrosion or scale formation is a function of some balance of impurities. It appears the purer the raw material, the higher the corrosion rates.

Cooling the surface of a reactor with water, saline solutions, and the incoming phosphatic raw material has been used. This has retarded the growth of scale to a limited extent. Inevitably, plant shutdown is required to remove accumulated scale.

The present invention is directed to means to eliminate reactor scale in processes for reaction of phosphatic materials with ammonia.

SUMMARY OF THE INVENTION

The present invention is directed to elimination of scale formation in tubular reactors. Broadly, where scale is due to the reactor surfaces being at a temperature where scale forms by reaction of its constituents with high temperature reactants, such thermal phenomena are eliminated by cooling the exterior surface of the tubular reactor with an evaporating liquified gas, the cooling being sufficient to provide an internal reactor surface at a temperature where scale formation is essentially prevented.

In particular, a process of the invention is directed to the production of fertilizers by reaction of the superphosphoric acid with ammonia to yield a reactant in at least one tubular reaction zone providing an internal metal surface nonreactive with constituents of the reactants to form scale. To prevent scale passing cold liquid ammonia is passed through an annular passageway surrounding the tubular reaction zone in a quantity sufficient to remove by indirect heat exchange with accompanying vaporization of ammonia, at least about 45,000 BTU per square foot of internal metal surface per hour and sufficient to prevent scale formation on the interior metal surfaces. Preferably, at least about 50,000 BTU per square foot of internal metal surface per hour is removed. At least a portion of the ammonia utilized for cooling is introduced to the reaction zone and the balance to a quench zone where, with controlled water addition, the product is brought to desired fertilizer assay.

Cooling occurs by partial or total evaporation of the ammonia. The reacting melt stays at an essentially constant temperature ranging from about 600° to about 750° F.

To achieve this end, from about 50 to 100%, preferably about 70%, of the total ammonia requirements are fed to the annular passageway. The ammonia fed to the reactor will range from about 55 to about 75% of the total ammonia requirements, typically about 70%. Inlet ammonia temperatures will range from about 10° to about 30° F. and upon exiting the annular passageway ammonia temperatures will range from about 30° to about 170° F., preferably from about 30° to about 140° F. Flow may be co-current or counter current to the reactants. Totally or partially evaporated ammonia, after use as a heat exchange media to eliminate scale formation, is totally vaporized and introduced at a temperature above 100° F., preferably about 110° to about 170° F., and more preferably from about 120° to about 140° F. to the tubular reaction zone for reaction with the superphosphoric acid. The residue of the total ammonia provided to the operation is reacted with the initial products of the reaction of ammonia and superphosphoric acid in the tubular reactor in a quench zone. The balance of the reaction of ammonia with superphosphoric acid thus occurs in a zone separate from the tubular reaction zone.

Achieving the desired ammonia temperature without external heat exchange has been realized without scale formation. Internal reactor temperature is from about 600° to about 750° F., more typically about 625° to 700° F. Exit ammonia at temperatures as high as 130° F. have been realized with sufficient heat removal to prevent scaling.

The apparatus used to prevent scaling of a tubular reactor surface is a tubular reactor surrounded by an annular jacket through which the ammonia is passed. To prevent failures at flanges due to differences in thermal expansion, at least one thermal expansion joint is provided for each annular jacket.

Liquid ammonia is metered to the annular shell at least in a quantity sufficient to remove at least about 45,000 BTU/sq.ft./hr. of internal reactor surface, preferably at least about 50,000 BTU/sq.ft./hr. If excess ammonia is fed to the tubular reactor it will be consumed in the subsequent quench reaction.

The instant invention will be explained in detail in the following description.

DRAWINGS

FIG. 2 illustrates another scheme for carrying out the practice of the instant invention.

DETAILED DESCRIPTION

Figure 1:
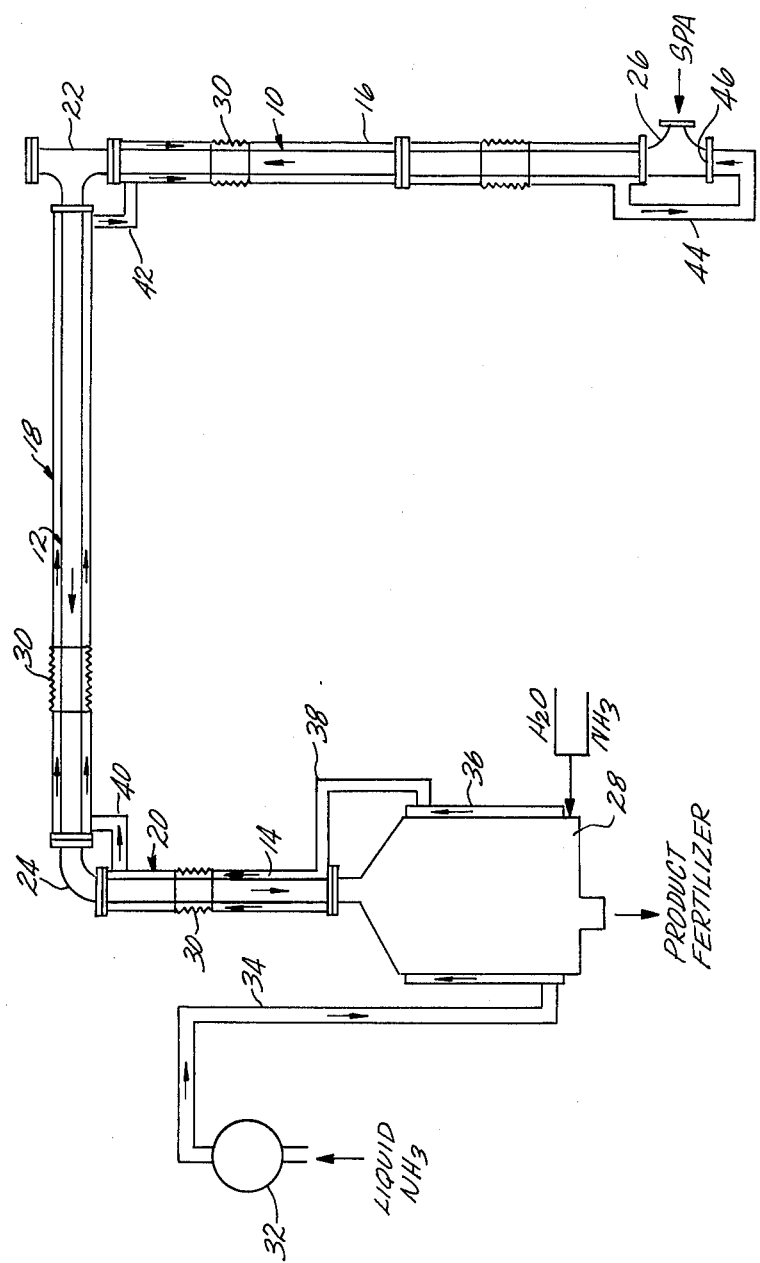
FIG. 1 illustrates one configuration for carrying out the practice of the instant invention.

With reference to FIG. 1, there is provided a tubular reactor having sections 10, 12, and 14 in which vaporized ammonia ($NH_3$) is reacted with superphosphoric acid (SPA) in quantities sufficient to produce a fertilizer melt of determined nitrogen and phosphorous ($P_2O_5$) content. Surrounding reactor 10 is annular jacket 16, while annular jacket 18 surrounds tubular reactor 12 and annular jacket 20 surrounds tubular reactor 14. Tubular reactor 10 is joined to tubular reactor 12 by tee 22 which allows inspection of the tubular reactors and their cleaning as may be required. Tubular reactor 12 is joined to tubular reactor 14 by elbow 24. Reactants are fed to the reactors through tee 26. Products of the reactors are discharged into quench tank 28 where water and ammonia are added to the melt to bring the product to desired assay, e.g., 10-34-0, 11-37-0, 12-40-0, etc.). The amount of water added is the controlling variable and vaporization of water in the quench is always accounted for. The constituents in the quench tank will have a pH from 5.9 to about 6.1.

In carrying out the process with the scheme depicted in FIG. 1, liquid ammonia, preferably anhydrous ammonia to prevent internal icing, is fed through each of the jackets 20, 18, then 16 in series counter current to the flow of reactants in tubular reactions 10, 12, and 14. Each jacket includes at least one expansion joint 30 to account for the differential thermal expansion occuring between the heated tubular reactor and the super cool surrounding jackets. This prevents breakage or other failure at flange weld joints.

To carry out the process using the scheme as depicted in FIG. 1, liquid ammonia is fed through metering instrument 32 at a temperature from about 10 to about 30° F., preferably from about 10° to about 20° F. through conduit 34, then annular jacket 36 surrounding quench tank 28. Lower temperatures can also be employed. From the surrounding jacket the liquid ammonia and any vaporized ammonia is passed by conduit 38 to jacket 20 for maintaining the internal surfaces of reactor 14 at a temperature at which the constituents of the melt will not react and accumulate on the internal walls of the tubular reactor so as to result in scale formation. Ammonia from annular jacket 20 is passed by conduit 40 to annular jacket 18 where again heat of reaction is extracted and the internal surfaces of the reactor maintain below a scale forming temperature. Ammonia from jacket 18 passes by conduit 42 to jacket 16 and from jacket 16 through conduit 42 as a feed to the inlet 26 of tubular reactor 10. Ammonia fed to inlet 26 is totally vaporized when combined with superphosphoric acid fed to inlet 26 to prevent expansive explosions. In the configuration as shown in FIG. 1, the ammonia flow is counter current to the flow of reactants. In this operation and other operations it is possible to achieve full vaporization of the ammonia passing through the annular jackets and wherein the vapors are heated to a suitable temperature for introduction to a reactor. Such a temperature is 100° to about 170° F., typically from about 130° to about 140° F. If heating is insufficient, external heating is employed as is shown for the scheme shown in FIG. 2. The criteria is that if the surface available for heat exchange with ammonia is inadequate for total vaporization of ammonia to be fed to the tubular reactor, external heating is required. Ammonia flow can be reduced but external heating will be required to heat the ammonia necessary for the reaction to a temperature above about 100° F.

FIG. 2 illustrates an alternate system in which ammonia flow is co-current with the flow of reactants and external heating of ammonia is employed. With reference to FIG. 1, there are again employed tubular reactors 10, 12, and 14, each surrounded by annular jacket 16, 18, and 20, including expansion joint 30. Tubular reactor 10 is connected to reactor 12 by tee 22 and reactor 12 to reactor 14 by inspection tee 23. The intermediate product melt is discharged to quench tank 28 where water and ammonia are added to bring the fertilizer to desired assay.

In this sequence the exotherm of the reaction is insufficient to vaporize sufficient ammonia in amount to achieve a temperature suitable for introduction to reactor 10.

In operation, liquid ammonia is again fed by metering instrument 32 to conduit 34 to annular jacket 16 for cooling of the internal surfaces of reactor 10 to prevent scaling by heat exchange and vaporization. Liquid ammonia is then passed by conduit 40 to jacket 18 for cooling of the internal surface of tubular reactor 12 and by conduit 42 to jacket 20 to cool the internal surface of tubular reactor 14.

The ammonia to the extent vaporized is passed by conduit 46 to heat exchanger 48 where the ammonia is vaporized and heated to a temperature consonant for feed to reactor 10. In the alternative or in addition, the ammonia may be fed to a jacket surrounding quench tank 28 for partial heating ahead of its feed to jacket 16. As shown, ammonia passes by conduit 50 from heat exchanger 48 to reactant introduction tee 26 for passage to tubular reactor 10.

The overall criteria of the process is that the ammonia be primarily used to cool the internal reactor surfaces to a temperature sufficiently low to prevent scale forming reactions. It has been found that in utilizing ammonia at a feed temperature of about 10° to about 20° F. and in an amount required for reaction in the tubular reactors, e.g., 70% of the total ammonia requirements for production of 10-34-0, exit temperatures of the ammonia from the annular jacket 20 can range from about 30° to 135° F. without formation of scale in the jacketed portions of the reactors. In general, the ammonia must remain at least about 45,000 BTU/square foot of internal reactor surface/hr. If this is realized, scaling will be essentially prevented. Preferably at least about 50,000 BTU/square foot of internal reactor surface/hour is removed.

Minor scaling at tees and elbows can still occur. Using ammonia-fed coils around such connecting units will realize total elimination of scaling.

The amount of ammonia fed to the annular passageway surrounding the tubular reactor will range from about 50 to 100% of the total ammonia requirements of the process, preferably from about 50 to about 70% and more preferably about 70%. The amount of ammonia introduced to the tubular reactor is from 55 to about 75%, preferably 70% of the total ammonia required for the process. The balance is fed to the quench zone. All of the ammonia can be fed to the tubular reactors. The excess ammonia will be consumed in the quench zone. Pressure is not narrowly critical so long as sufficient vaporization occurs to remove at least about 45,000 BTU/square foot of internal reactor surface/hr. Independent of exit ammonia temperatures, the melt in the reactor remains essentially constant throughout the length of the reactor.

EXAMPLE 1

Apparatus as depicted in FIG. 1 was used. The tubular reactors were 4" I.D. and the annular jackets 6" I.D. Tubular reactor wall thickness was 0.25". Materials of construction were 316 LC stainless steel. Jacketed reactor section 10 was 10' in length, reactor section 12, 10' and reactor 14, 5'. Jacketed quench tank 28 was 30" in diameter and 36" deep. Superphosphoric acid was fed to the reactor 10 at the rate of 617 gal/hr., equivalent to a feed of 7,400 lbs. of $P_2O_5$ per hour. Inlet temperature was 150° F. Total ammonia requirements for production of 10-34-0 was 2675 lbs. per hour. Seventy percent of this ammonia as anhydrous ammonia was fed to the annular jackets at an initial temperature between 10° and 20° F. The balance of the ammonia and about 1,500 gal./hr. of water were fed to the quench tank. The ammonia exited jacket 16 at about 130° F. for feed to reactor 10. Internal reactor temperature was about 650° F. Total production of 10-34-0 was between 10 and 11 tons per hour. After production of 7,800 tons of 10-34-0, the reactors were inspected with no scaling observed. Operation continued without scale formation.

EXAMPLE 2

The configuration shown in FIG. 2 was used except that jacketed reactor 10 was 10' in length, reactor 12, 2' in length, and reactor 14, 7' in length. Quench tank 28 was 5' in diameter and 30" high. Throughput of materials was doubled to the end of producing 22+ tons of 10-34-0 per hour. Ammonia in this instance exited jacket 20 at temperatures ranging from 30° to 60° F. with internal reactant melt temperature remaining at at least 650° F. The ammonia was heated in exchanger 48° to 130° F. for feed to reactor 10. Continuous scale-free operation of the jacketed reactor has been experienced.

The principle of this invention can be applied to other reaction systems requiring quench mixing of reactants. The principle is valuated in a tubular reactor used to acidify the sodium salt of 2,4D- sodium 2,4-dichlorophenoxy acetate $C_6H_3Cl_2\text{-}0\text{-}CH_2\text{-}COONa$ with sulfuric acid to form the 2,4 acid of $C_6H_3C_2\text{-}0\text{-}CH_2COOH$ and sodium sulfate. In this instance jacket cooling by evaporation of a liquified gas, chlorine, was used to maintain a reactant slurry at about 100° to 105° C. or less to maintain desired product color and prevent excess steam generation.

What is claimed is:

1. In a process for the production of fertilizers by reaction of superphosphoric acid with ammonia to yield a high temperature reactant melt in a tubular reaction zone providing an interior metal surface in contact with said reactant melt, the constituents of which are potentially reactive to form scale by temperature determined reactions, the method of preventing scale formation. The improvement comprising passing cold liquid ammonia through an annular passageway surrounding said tubular reaction zone in an amount sufficient to remove at least about 45,000 BTU/sq. ft. of internal metal surface/hr by indirect heat exchange with accompanying total vaporization of ammonia, whereby the interior metal surface of the tubular reaction zone will be maintained at a temperature below a temperature at which scale formation will initiate and passing the vaporized ammonia into said tubular reaction zone.

2. A process of claim 1 in which at least about 50,000 BTU/sq. ft. of internal reactor surface/hr. is removed by the ammonia passing through said annular passageway.

3. A process for fertilizer production by reaction of superphosphoric acid with ammonia which comprises:
   (a) maintaining in a tubular reaction zone a flowing reactant mix including a melt of reacting superphosphoric acid and ammonia, the ammonia being present in an amount of from about 55 to about 75% of the total ammonia required for reaction with superphosphoric acid and the melt product of reaction of superphosphoric with ammonia, said tubular reaction zone providing an internal metal surface subject to scaling by constituents of the reactant mix;
   (b) passing cold liquid ammonia in an amount of from about 50 to 100% of the total ammonia required for reaction with the superphosphoric acid and the product of reaction of superphosphoric acid with ammonia in the tubular reaction zone, through an annular passageway surrounding said tubular reaction zone to sufficiently cool the internal metal surface of said tubular reaction zone by indirect heat exchange with accompanying total vaporization of ammonia to maintain said internal metal surface below a temperature at which scale forming reactions will occur with constituents of said reactant mix;
   (c) passing vaporized ammonia from said annular passageway into said tubular reaction zone at a temperature of at least about 100° F. for reaction with superphosphoric acid.

4. A process as claimed in claim 3 in which from about 50 to about 70% of the total ammonia is fed to said annular passageway.

5. A process as claimed in claim 3 in which about 70% of the total ammonia is fed to said tubular reaction zone.

6. A process as claimed in claim 3 in which the tubular reaction zone is maintained at a temperature from about 600° to about 750° F.

7. A process as claimed in claim 3 in which the liquid ammonia introduced to said annular passageway at a temperature from about 10° to about 30° F.

8. A process as claimed in claim 3 in which the ammonia is introduced to said annular passageway at a temperature from about 10° to about 20° F.

9. A process as claimed in claim 3 in which the ammonia exits said annular passageway at a temperature from about 30° to about 120° F.

10. A process as claimed in claim 3 in which the ammonia exits said annular passageway at a temperature from about 30° to about 140° F.

11. A process for production of fertilizers formed by reaction of superphosphoric acid and ammonia which comprises:
   (a) introducing into a tubular reaction zone providing an internal metal surface surrounded by a jacket forming an annular cooling zone, superphosphoric acid and totally vaporized ammonia obtained in step (b) in a quantity of from about 50 to about 100% of the total ammonia required for reaction with the superphosphoric acid to provide a fertilizer of predetermined assay, the superphosphoric acid and ammonia forming a reactant mix passing through the reaction zone at a temperature from about 600° to about 750° F., with constituents of the reactant mix being capable of forming scale upon said internal metal surface;

(b) introducing liquid ammonia at a temperature from about 10° to about 30° F. to the annular cooling zone in a quantity of from about 50 to about 100 percent of the total ammonia required for reaction with superphosphoric acid and sufficient to remove by indirect cooling and vaporization of ammonia, sufficient heat from the reaction zone to essentially prevent the formation of scale by reaction of the constituents of said reactant mix with said metal surface but insufficient to substantially diminish the temperature in said tubular reaction zone.

12. A process as claimed in claim 11 in which from about 55 to about 75% of the total ammonia required for reaction with superphosphoric acid is fed to the tubular reaction zone.

13. A process as claimed in claim 11 in which about 70% of the total ammonia required for reaction with superphosphoric acid is fed to the tubular reaction zone.

14. A process as claimed in claim 4 in which from about 50 to about 70% of the total ammonia required for reaction with superphosphoric acid is fed to the annular cooling zone.

15. A process as claimed in claim 11 in which the ammonia exits the annular cooling zone at a temperature from about 30° to about 170° F.

16. A process as claimed in claim 11 in which the ammonia exits the annular cooling zone at a temperature from about 30° to about 140° F.

17. A process as claimed in claim 3 further comprising externally heating vaporized ammonia, which exits the annular passageway at a temperature less than about 100° F. to at least about 100° F.

* * * * *

UNITED STATES PATENT AND TRADEMARK OFFICE
CERTIFICATE OF CORRECTION

PATENT NO. : 4,210,438
DATED : July 1, 1980
INVENTOR(S) : Philip W. Casperson

It is certified that error appears in the above-identified patent and that said Letters Patent are hereby corrected as shown below:

Column 2, line 33, after "preferably" insert -- from --.
Column 5, line 9, after "was 10" delete "°" and insert -- ' --.
Column 5, line 37, after "48" delete "°".

Column 5, line 59, "The" should be -- the --.

Signed and Sealed this

Thirty-first Day of March 1981

[SEAL]

Attest:

RENE D. TEGTMEYER

Attesting Officer    Acting Commissioner of Patents and Trademarks